May 1, 1956     J. K. HUBBARD     2,744,085
PROCESS OF MAKING DISPERSIONS OF POLYMERS
Filed Sept. 15, 1953
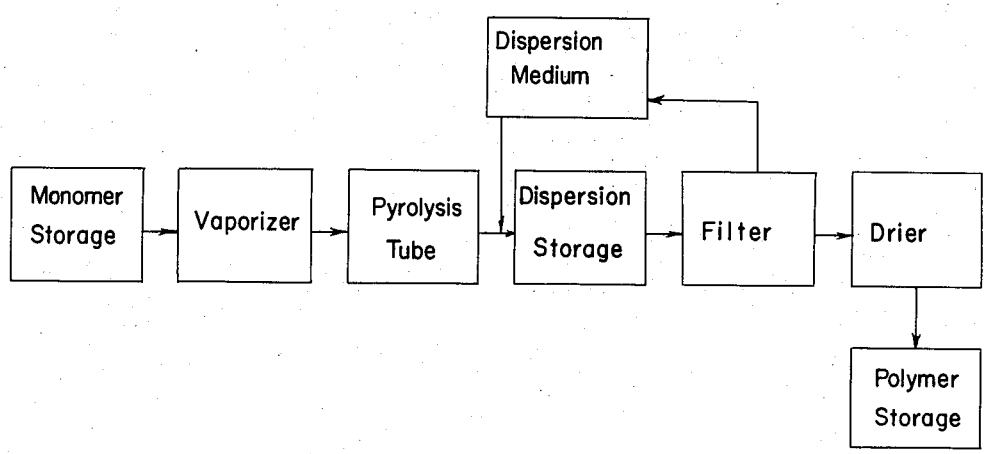
INVENTOR
JAMES K. HUBBARD
BY *Carl A. Hechmer*
ATTORNEY : 2,744,085
Patented May 1, 1956

2,744,085
PROCESS OF MAKING DISPERSIONS OF POLYMERS

James K. Hubbard, West Chester, Pa., assignor to E. I. du Pont de Nemours and Company, Wilmington, Del., a corporation of Delaware Application September 15, 1953, Serial No. 380,195

9 Claims. (Cl. 260—33.6)

This invention relates to dispersions of a poly-p-xylene and to a process for its preparation. By the term "a poly-p-xylene" is meant poly-p-xylene and its related substituted polymeric derivatives and copolymers as defined hereinafter.

The preparation of polymers by pyrolyzing aromatic compounds with methyl groups substituted at the 1,4- or para-positions has been disclosed in British Patents 640,494 and 650,947. These patents describe the pyrolysis of paraxylene at 700 to 1,000° C. to produce a polymer, the polymer being collected in the form of a film which deposits on the walls of a receiver. The films are thereafter stripped from the receiver. In the preparation of fibers, filaments and chemical derivatives of these polymers, it has been necessary to first grind the film to a powder.

It is an object of this invention to provide a poly-p-xylene, i. e. polymers derived from aromatic compounds with methyl groups in the 1,4- or para-positions in a comminuted form.

Another object is to provide a process for the preparation of a stable dispersion of the above described polymer.

A further object is to provide dispersions of the above described polymer.

These and other objects will become apparent in the course of the following specification and claims.

In accordance with the present invention pyrolyzed monomer vapor or mixtures of vapors of p-xylene and/or its related materials are turbulently mixed with a moving surface of a liquid organic or aqueous organic medium. A dispersion of the polymer in the liquid results. To obtain the polymer in the comminuted form, the dispersion medium is filtered off and the powder is dried.

Figure 1 is a flow sheet depicting the preferred embodiment of the process of the present invention.

The following examples are cited to illustrate the invention. They are not intended to limit it in any way.

Example I

Liquid p-xylene is vaporized at reduced pressure at 70° C. The monomer feed vapor is introduced at a pressure of about 1 millimeter into a 15" quartz tube having an inside diameter of 1.38" and packed with small pieces of quartz tubing. The flow is controlled so that about 66 grams of monomer are consumed per hour. The pyrolysis tube is maintained at a temperature of about 950° C. As the pyrolyzed monomer vapor passes from the pyrolysis tube, it is jetted into a stream of tetrahydronaphthalene, which falls into a container. The monomer is converted to polymer and a dispersion of finely-divided solid poly-p-xylene in tetrahydronaphthalene is obtained. The dispersion is recycled until it contains approximately 4% by weight of polymer. This requires about two hours. At this point the dispersion becomes too viscous to pump efficiently. The dispersion is replaced by fresh tetrahydronaphthalene and the polymerization is continued.

Example II

The process of Example I is modified by the replacement of the tetrahydronaphthalene with a chlorinated biphenyl containing about 21% chlorine. After 1½ hours a dispersion is obtained which contains approximately 3% of the poly-p-xylene.

Example III

Pseudocumene is employed as the monomer in the process described in Example I. The pyrolyzed monomer vapor is contacted with a turbulent flowing stream of tetramethylenesulfone. The liquid is recirculated for about 1½ hours. A dispersion containing approximately 2.5% polypseudocumene results.

Dispersions can also be prepared using a mixture of water and a water-miscible organic liquid as the dispersing media. More stable and uniform dispersions are obtained when the dispersing medium contains a dispersing agent. The following example illustrates a specific application of such a modification.

Example IV

A dispersing medium is prepared by mixing 8 volumes of ethylene glycol and 2 volumes of water and adding 0.5% by weight of "Duponol" ME (a fatty alcohol sulfate manufactured by the du Pont Company). This liquid mixture is connected to a pyrolysis system as described in Example I. The liquid is circulated through a heat exchanger to maintain its temperature at about 0° C. Liquid is fed at a rate of about 17 gals./hr. The monomer is converted to polymer. After 35 minutes the polymer dispersion becomes too thick to pump efficiently. It contains approximately 1% polymer.

Example V

Solvent is removed from the dispersion of Example II by heating to 80° C. under reduced pressure while stirring until the mixture contained approximately 50% polymer. This mixture is milled on a heated rubber mill to give a uniform solid solution. Films are pressed from this solution at a temperature of 305° C. and a pressure of approximately 2,000 p. s. i. The films were drawn 3X at 200° C. The drawn and oriented film had a tenacity of approximately 2 g. p. d.

Example VI

A 1% dispersion of poly-p-xylene in a tetramethylenesulfone is prepared employing the technique as described in Example I. 1500 ml. of this dispersion are diluted with 1,000 ml. of acetone. The polymer precipitates. It is filtered and dried. 15 grams of the dried polymer is then milled on a heated rubber mill with 10 ml. of a chlorinated biphenyl containing 48% chlorine to give a solid solution containing 50% polymer. This composition is melt-spun through a hot needle spinneret (1½ inches long, having an inside diameter of 0.020 inch) at a temperature of about 300° C. and under a pressure of about 2,000 lbs. per sq. inch. The as-spun filaments have a tenacity of about 0.3 g. p. d. Upon drawing they exhibit increased tenacity, toughness and flexibility.

Example VII

The polymer is precipitated from the dispersion of Example IV by addition of sodium chloride. The polymer is washed to remove salt and thereafter dried. It is suitable for subsequent processing into films and filaments.

Example VIII 500 ml. of the dispersion of Example III is diluted with 1,000 ml. of acetone. The polymer precipitates. It is filtered and dried. The polymer is thereafter press-spun at 325–330° C. and 1500–2000 p. s. i. in standard melt-spinning equipment fitted with a needle-type spinneret as described in Example VI. The filaments which are produced are drawn and oriented at a temperature of about 90° C.

The foregoing examples are limited to the preferred embodiment wherein the monomer vapor and dispersing medium are jetted together into a storage container, the process may also be carried out by bubbling the monomer gases into the surface of the dispersing medium. In this process care must be exercised to avoid sucking the dispersing medium into the pyrolysis system. The following example illustrates such a process.

Example IX

A pyrolysis system similar to that of Example I is employed. The exit end of the pyrolysis tube is connected with a flask approximately half filed with tetrahydronaphthalene. The pyrolyzed monomer vapors are caused to bubble through the tetrahydronaphthalene by passing them into an adaptor tube immersed to a depth of approximately ⅛″ below the surface of the liquid in the flask. Polymer dispersions similar to those of Example I are obtained. While the product obtained employing this technique is satisfactory, difficulty is experienced in continuous operation due to the plugging of the immersed orifice after extended operation.

The nature of the organic dispersing medium is not critical. A wide variety of organic liquids has been found to be operable. These include alkyl, aryl, aralkyl and alicyclic hydrocarbons as well as ketones, alcohols, esters, ethers, sulfones, halogen-containing and various heterocyclic compounds. It is preferred that the dispersing medium be an organic liquid which does not boil at room temperature under 1 mm. pressure. As specific examples of suitable organic liquids may be mentioned tetrahydronaphthalene, decahydronaphthalene, chlorinated biphenyls containing from 1 to 5 chlorine atoms, Primol D (a white mineral oil), ethylene glycol and liquid higher polymethylene and polyethylene glycols, tetramethylenesulfone, benzyl benzoate, di(2-ethylhexyl) phthalate, cyclohexanone, cyclohexanol, diphenylmethane, diisopropylbenzene, toluene and xylene. Of these tetrahydronaphthalene and the chlorinated biphenyls are especially useful. In many cases the process can be facilitated by adding a dispersing agent, such as the fatty alcohol sulfates or the alkali metal sulfonates of aralkyl hydrocarbons to the dispersion medium. As noted previously, mixtures of water-miscible organic liquids with water may be used. Of these those containing less than 50% water are preferred.

This process for preparing dispersions is unique in that the monomer vapor is converted directly to polymer dispersion. The polymerization occurs when the vapor comes in contact with the liquid and the polymeric product is formed as small particles dispersed in the liquid medium.

These polymer dispersions may be used directly for some applications, such as the preparation of chemical derivatives of the polyhydrocarbons. The polymer dispersions are usually too dilute for direct use in the preparation of fibers and films. These can be prepared by precipitating the polymer and processing the powdered polymer. However it is preferred to prepare the dispersions in a liquid which acts as a plasticizer and then concentrate the dispersions to the desired solids concentration.

After sufficient milling to improve the homogeneity, fibers and films may be fabricated from the plasticized compositions. This has proved to be the most direct and most practical method for preparing fibers and filaments. It is possible, of course, to prepare solid solutions and plasticized compositions from the powdered polymer which has been precipitated from a dispersion. It is also possible to utilize some of the precipitated polymers directly. For example, precipitated polypseudocumene can be melt-spun into fibers and pressed to form films. It is often advantageous to draw and orient the fibers and films so prepared in order to increase strength, flexibility and durability.

This invention provides a practical method for isolating polyhydrocarbons related to poly-p-xylene in a form which may be readily utilized in subsequent processing. The products have been found to possess many desirable qualities, such as toughness, insolubility in acids, alkali and most organic solvents, good electrical properties and high melting points. Their excellent electrical properties permits their use as coatings for wire, transformers, etc., where high electrical and solvent resistance and low vapor permeability are desired. Oriented fibers and filaments are useful in industrial fabrics, such as filter cloths and wherever unusually high solvent resistance, corrosion resistance and good thermal stability at high operating temperatures are required. These same properties make films of these materials particularly desirable for many packaging applications.

The preparation of dispersions of poly-p-xylene and polypseudocumene in various dispersing media has been described in the examples. However, the invention is not limited to these particular polymers, but is equally applicable to polymers, copolymers and mixed polymers having the recurring structural unit

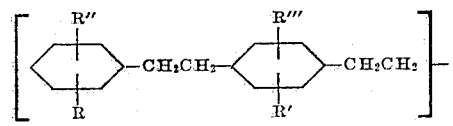

in which R, R′, R″ and R‴ represent nuclear hydrogen or one or more replacements for nuclear hydrogen. The hexagon represents the benzene nucleus. The preferred polymers are those in which R, R′, R″ and R‴ represent nuclear hydrogen, phenyl, methyl or halo groups. Chlorine is the preferred halogen. Representative examples include poly-p-xylene, polypseudocumene, the copolymer of para-xylene and pseudocumene, polydurene, polychloro-p-xylene, polyphenyl-p-xylene and the like.

Many equivalent modifications will be apparent to those skilled in the art from a reading of the disclosure without a departure from the inventive concept.

What is claimed is:

1. A process which comprises turbulently mixing an organic liquid which does not boil at room temperature under 1 mm. pressure with the pyrolyzed vapors of a monomeric aromatic compound containing para-methyl substituents, the said monomeric aromatic compound being a member of the class consisting of a hydrocarbon and a halogen substituted hydrocarbon, to form a dispersion of a polymer containing recurring units of the formula:

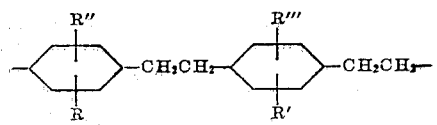

wherein R, R′, R″ and R‴ represent a member of the class consisting of hydrogen, phenyl, methyl and halogen, the hexagon representing the benzene nucleus.

2. The process of claim 1 wherein a mixture of the pyrolized vapors and organic liquid are jetted from an orifice.

3. The process of claim 2 wherein the monomer is p-xylene.

4. The process of claim 2 wherein the monomer is pseudocumene.

5. The process of claim 3 wherein the dispersing medium is tetrahydronaphthalene.

6. The process of claim 4 wherein the dispersing medium is tetrahydronaphthalene.

7. The process of claim 1 wherein the organic liquid is a plasticizer for the polymer produced.

8. The dispersion produced by the process of claim 1.

9. The dispersion produced by the process of claim 7.

References Cited in the file of this patent

FOREIGN PATENTS

| | | |
|---|---|---|
| 640,494 | Great Britain | July 19, 1950 |
| 673,651 | Great Britain | June 11, 1952 |

OTHER REFERENCES

Journal of Polymer Science, volume 6, Number 3, pages 319–329, article by Swarc, March 1951.